US012602696B2

(12) United States Patent
Rai et al.

(10) Patent No.: US 12,602,696 B2
(45) Date of Patent: Apr. 14, 2026

(54) LABEL BIASING USING INTERPOLATION

(71) Applicant: Freshworks Inc., San Mateo, CA (US)

(72) Inventors: Dushyant Kumar Rai, Bangalore (IN); Swaminathan Padmanabhan, Chennai (IN); Chetan Bhat, Bangalore (IN)

(73) Assignee: Freshworks Inc., San Mateo, CA (US)

( * ) Notice: Subject to any disclaimer, the term of this patent is extended or adjusted under 35 U.S.C. 154(b) by 190 days.

(21) Appl. No.: 18/510,514

(22) Filed: Nov. 15, 2023

(65) Prior Publication Data

US 2025/0156880 A1 May 15, 2025

(51) Int. Cl.
 *G06Q 30/015* (2023.01)

(52) U.S. Cl.
 CPC .................................. *G06Q 30/015* (2023.01)

(58) Field of Classification Search
 CPC ...................................................... G06Q 30/015
 See application file for complete search history.

(56) References Cited

U.S. PATENT DOCUMENTS

| | | | | |
|---|---|---|---|---|
| 12,260,370 | B1 * | 3/2025 | Melancon ................ | G06N 5/01 |
| 2021/0241033 | A1 * | 8/2021 | Yang ..................... | G06F 18/217 |
| 2022/0405775 | A1 * | 12/2022 | Siebel ................ | G06Q 30/0202 |
| 2024/0037580 | A1 * | 2/2024 | Miller-Smith ..... | G06Q 30/0202 |
| 2024/0086947 | A1 * | 3/2024 | Nambirajan ....... | G06Q 30/0201 |

FOREIGN PATENT DOCUMENTS

| | | | | |
|---|---|---|---|---|
| WO | WO-2021154428 A1 * | 8/2021 | ............. | G06N 20/00 |

OTHER PUBLICATIONS

J. P. G. Custódio, C. J. Costa and J. P. Carvalho, "Success Prediction of Leads—A Machine Learning Approach," 2020 15th Iberian Conference on Information Systems and Technologies (CISTI), Seville, Spain, 2020, pp. 1-6. (Year: 2020).*
D. Rotovei and V. Negru, "A methodology for improving complex sales success in CRM Systems," 2017 IEEE International Conference on INnovations in Intelligent Systems and Applications (INISTA), Gdynia, Poland, 2017, pp. 322-327. (Year: 2017).*
S. Emtiyaz and M. Keyvanpour, "Customers Behavior Modeling by Semi-Supervised Learning in Customer Relationship Management," Advances in information Sciences and Service Sciences (AISS), vol. 3, No. 9, Oct. 2011, pp. 229-236. (Year: 2011).*

* cited by examiner

*Primary Examiner* — Jeff Zimmerman
*Assistant Examiner* — Hunter Molnar
(74) *Attorney, Agent, or Firm* — LeonardPatel PC; Michael A. Leonard, II; Sheetal S. Patel

(57) ABSTRACT

Label biasing of data associated with one of a plurality of closed deals using interpolation includes retrieving, by at least one processor, training data from a data storage, and sampling, by the at least one processor, the training data periodically to capture one or more stages for each of a plurality of open deals. This also includes computing, by the at least one processor, a label for each of the plurality of open deals and a plurality of closed deals. The label is computed with a '1' or '0', in some embodiments. This further training, by the at least one processor, a model on the periodically sampled training data associated with the plurality of closed deal, and generating, by the at least one processor, a score for each of the plurality of closed deal and for each of the plurality of open deals.

14 Claims, 4 Drawing Sheets

Figure 3:
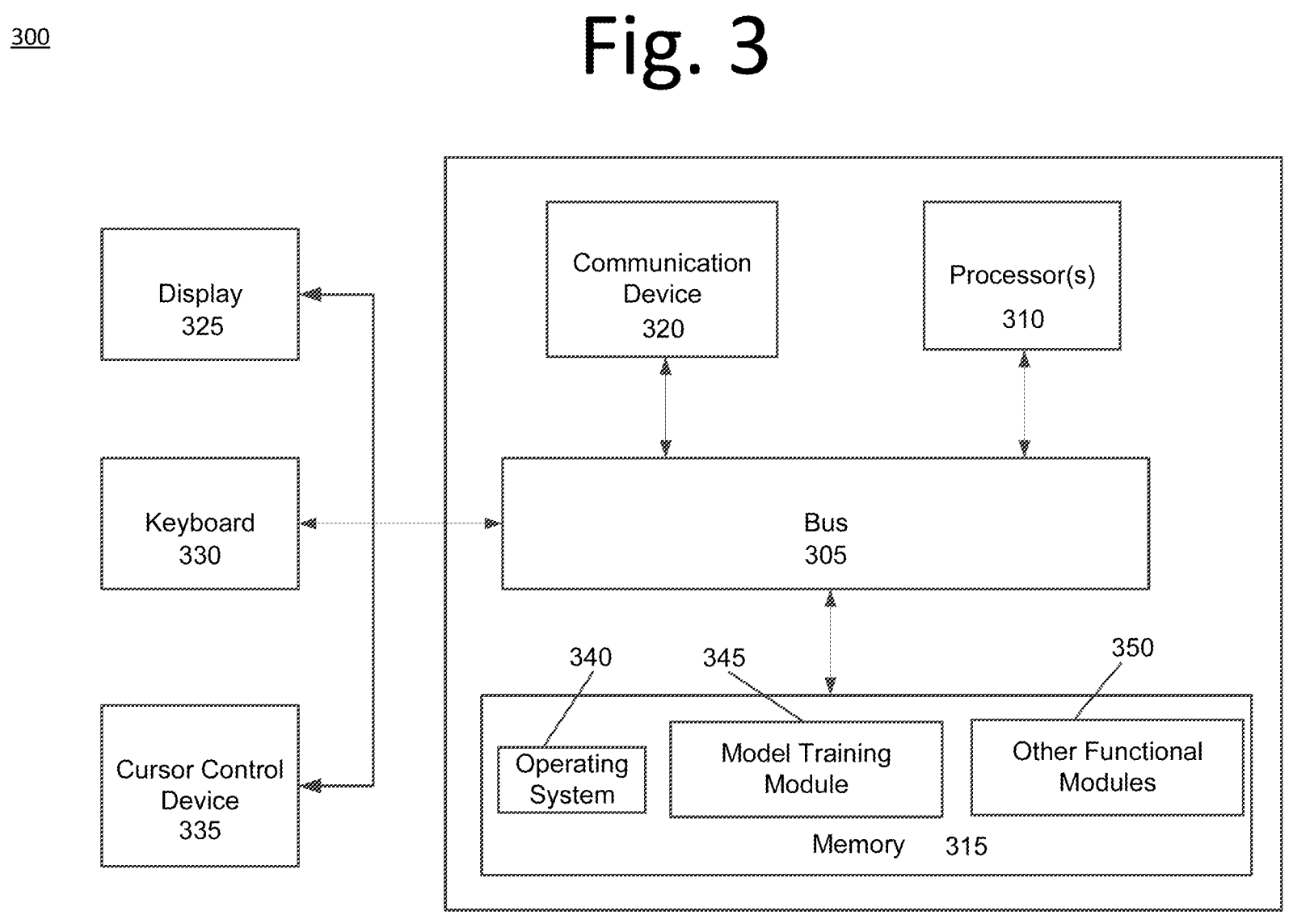

Processor(s)
310

Communication
Device
320

Bus
305

Memory   315

Other Functional
Modules
350

Model Training
Module
345

Operating
System
340

Display
325

Keyboard
330

Cursor Control
Device
335

400

Start

405

Retrieving trained data from a data storage

410

Performing weekly sampling of the training data

415

Computing a label for each deal

420

Training a model

425

Generating a score

End

LABEL BIASING USING INTERPOLATION

FIELD

The present invention relates to customer resource management (CRM), and more particularly, to identifying and correcting for label biasing of data using interpolation.

BACKGROUND

Although deals are transactions, for purpose of explanation, information of the deals are stored as records and several of these records are stored in databases. In short, deals may be considered data files. Deal scoring is a technology used with respect to CRM-based software applications. A deal score helps with categorizing and ranking a deal based on probability of success. The score represents the likelihood that the deal will convert. Conversion means that a purchase of a product or service transpired. The primary objective is to focus on deals where a user is genuinely interested in making a purchase. The deal score allows for prioritizing deals that have a higher likelihood of success.

FIG. 1 is a flow diagram illustrating related art of a method 100 for training a model on sampled data, according to an embodiment of the present invention. In method 100, a model is trained on data sampled at the end-stage of the deal at 105. This data represents all closed deals, where labels are binary (either 'won' or 'lost') depending on the outcome of the closed deal. See step 110. It should be noted that the features are computed and aggregated only at the end of the deals' lifecycle. However, during inference, the stage of the deal is unknown, i.e., is the deal in its infancy stage or in the closing stage.

At 115, the model is trained using the labels, and at 120, the trained model is generated. At 125, production data is also captured and combined with the trained model to produce a score for each closed deal.

It should be noted that, in training data, sampled deals that have already been closed, meaning they have gone through their entire lifecycle, are collected. However, during inference, the deals may be at various stages of their journey. While training data contains deals of different ages, it is important to note that, from a distribution standpoint, the deals are sampled based on their closing dates, and the features are computed with reference to the deal closing date.

Consequently, the training and production data end up being sampled from different distributions, resulting in a biased model. During the inference stage, such a model would assume that the deals are either already closed or nearing closure, leading to biased probability scores. The farther the deal is from closing, the higher the uncertainty in the score. In production, there is no knowledge of the deal's lifetime.

Thus, an interpolation framework must be implemented to address this bias in the model. Accordingly, an improved label biasing technique may be beneficial.

SUMMARY

Certain embodiments of the present invention may provide solutions to the problems and needs in the art that have not yet been fully identified, appreciated, or solved by current email communication systems. For example, some embodiments of the present invention pertain to identifying and correcting label biasing of data using interpolation.

In an embodiment, a computer-implemented method for a label biasing of data using interpolation. The method includes retrieving, by at least one processor, training data from a data storage, and sampling, by the at least one processor, the training data periodically to capture one or more stages for each of a plurality of open deals. The method also includes computing, by the at least one processor, a label for each of the plurality of open deals and a plurality of closed deals. The label is computed with a '1' or '0', in some embodiments. The method includes training, by the at least one processor, a model on the periodically sampled training data associated with the plurality of closed deal, and generating, by the at least one processor, a score for each of the plurality of closed deal and for each of the plurality of open deals.

In another embodiment, a system configured to perform label biasing of data using interpolation. The system includes memory comprising a set of instructions and at least one processor. The set of instructions are configured to cause at least one processor to execute retrieving training data from a data storage, and sampling the training data periodically to capture one or more stages for each of a plurality of open deals. The set of instructions are further configured to cause at least one processor to execute computing a label for each of the plurality of open deals and a plurality of closed deals. The label is computed with a '1' or '0', in some embodiments. The set of instructions are further configured to cause at least one processor to execute training a model on the periodically sampled training data associated with the plurality of closed deal, and generating a score for each of the plurality of closed deal and for each of the plurality of open deals.

In yet another embodiment, a computer program, which is embodied on a non-transitory computer-readable medium, is configured to perform label biasing of data using interpolation. The computer program is configured to cause at least one process to execute retrieving training data from a data storage, and sampling the training data periodically to capture one or more stages for each of a plurality of open deals. The computer program is further configured to cause at least one process to execute computing a label for each of the plurality of open deals and a plurality of closed deals. The label is computed with a '1' or '0', in some embodiments. The computer program is further configured to cause at least one process to execute training a model on the periodically sampled training data associated with the plurality of closed deal, and generating a score for each of the plurality of closed deal and for each of the plurality of open deals . . .

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a diagram illustrating a computing system configured to perform label biasing of data using interpolation, according to an embodiment of the present invention.

DETAILED DESCRIPTION OF THE EMBODIMENTS

Figure 1:
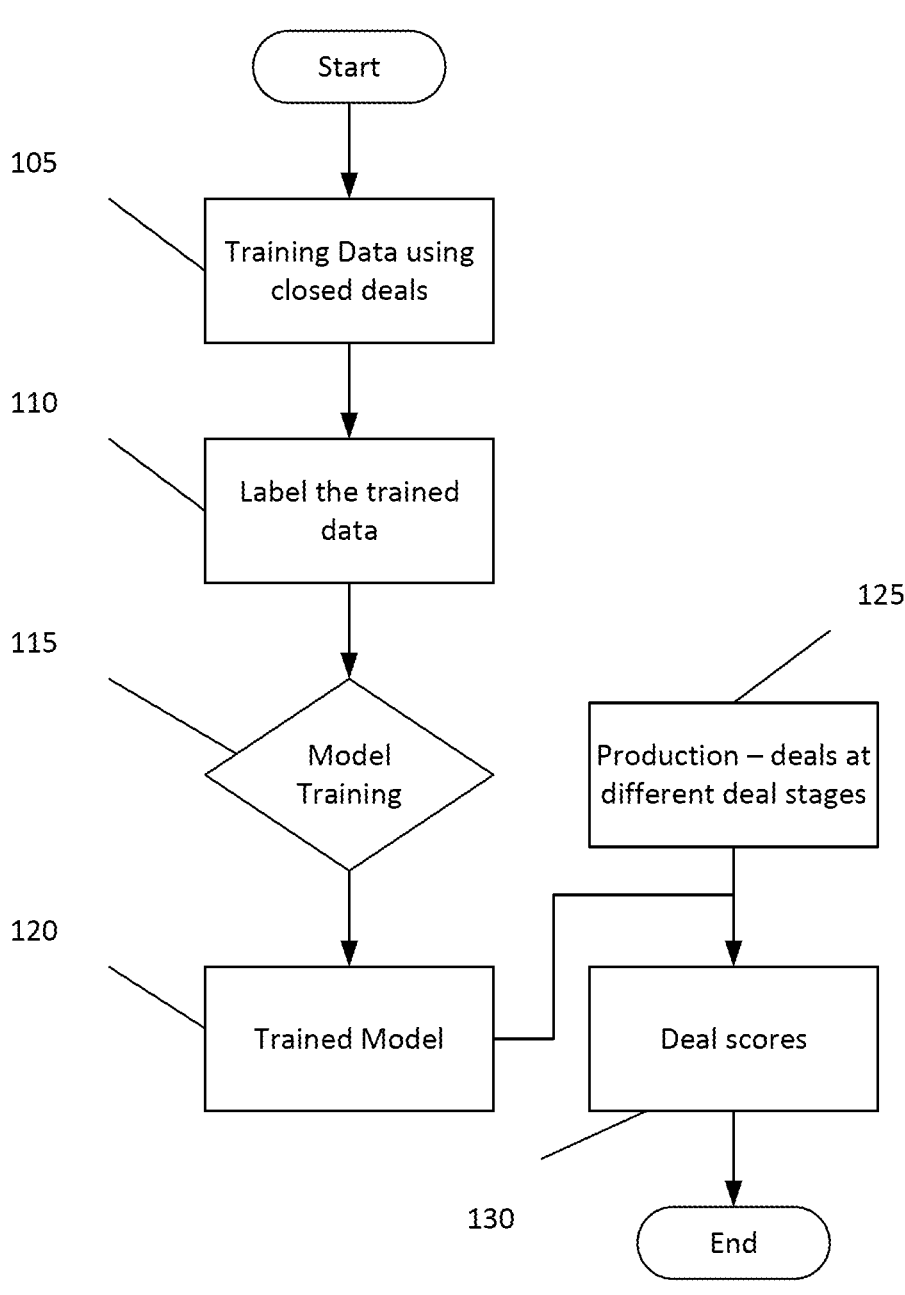
FIG. 1 is a flow diagram illustrating a method assigning scores to data associated with closed deals, according to an embodiment of the present invention.

Some embodiments generally pertain to performing label biasing of data using interpolation. As discussed above, the existing technology samples trained data once the deal is closed, resulting in disparity between the distribution of training data and production data. Training data includes closed deals. These closed deals may be sampled weekly during the lifetime of the deal to capture the multiple life stages of the deal. In some embodiments, features associated with the sampled data are computed. These features may be defined as time-static attributes of a deal that do not change with time. It should be noted that time-static attributes may change with time. For example, the amount of email interactions or non-email interactions, etc., are time-static attributes that may change over time. Production data may be defined as live data that are encountered in real-life as a deal progresses. In short, features include real-time and dynamic information about a deal as it progresses in its life cycle.

It should be noted that, in some embodiments, a weekly sampling approach is adopted for the training data, and the features are computed during the select sample dates in the deal's lifecycle. This is different from the existing method, where features are calculated once, i.e., computed on the deal closing date.

With the weekly sampled training data, deals at various stages of their lifetimes are included. Weekly sampling is selected in contrast to daily sampling in this embodiment to avoid repetitive information and to unnecessarily increase the size of the training data. As a result, after sampling weekly, a more similar distribution between the training and inference data is achieved. For purposes of explanation, inference data may be defined as production data itself.

It should be noted that for any data, where the deal is in the middle or beginning stages, there is limited data, since there is no label unless the deal is closed. For this reason, there are no labels for this data. To address the problem for lack of data, labels (for deals that are in the middle or beginning stages) are computed based on the following assumptions-(a) if the deal is won or successfully completed during the middle stage, all activities associated with the deal, including events and calls, have a positive impact, meaning that the deal was completed; (b) if the deal was lost, all activities have a negative impact, meaning that the deal was not completed; and (c) if an activity of significant interest (polarity) has occurred during a predefined timeframe, a positive or negative factor may be attributed to the label during that predefined timeframe. It should be appreciated that assumptions (a) and (b) are quantitative, that is, all factors, whether positive or negative, contribute equally, and assumption (c) is qualitative, that is, factors with significant interest are given more weight depending upon their impact.

To compute labels for data associated with deals in the middle stages, middle points are interpolated based on a number of activities as per assumptions (a) and (b). By using interpolation, labels are either characterized in 1's and 0's.

In the formulation assumptions (a) and (b) only, each activity is considered to be contributing equally (to deal win or loss), thus it is a simplified representation of reality. In practice, some activities or events may have a greater impact than others. To account for this, assumption (c) is used. For this, the impact of activities is included, and additional qualitative aspects to the middle-age deal labels are incorporated.

For instance, for email-related activities, sentiment analysis is leveraged and the "intent to buy" is assessed based on the text content. For example, email that have a positive tone or specifically mentions the intention of the customer have a higher impact as compared to other email or non-email related factors. This provides valuable insights into the impact of email interactions on deal outcomes.

Additionally, considering the stage-updates in the deal process provides additional information if the deal has moved towards winning or losing till that stage. For example, a deal can either be won or lost. In this example, however, there are few intermediate stages. In one example, if a deal moves to any positive intermediate stage, the deal is viewed as deal moving towards winning or vice-versa. Upgrades or downgrades in deal stages may reflect changes in the prospect's level of interest or engagement. These are relevant factors in predicting deal success. Other factors, such as strong e-mail sentiment and deal stage movement, are considered to influence the middle-age deal labels.

By incorporating these qualitative aspects of activities and stage updates into the intermediate label formulation, a more nuanced representation of the impact of different activities on the deal outcomes is captured.

It should be appreciated that by incorporating these additional aspects may result in fluctuations or variations in the labels. However, techniques to smooth out sudden surges or drops in labels over time are employed, ensuring a more stable and reliable representation.

Label may be defined as the amount of activity (including events, calls, non-email activities and email activities) that is captured using equation below. For example, if all activities are considered the same, i.e. using (a) and (b) only, the following formula may be used $$\text{label}_m = 0.5 + 0.5 * \left( \frac{\sum_{k=1}^{m} 1}{\sum_{i=1}^{n} 1} \right) * I_A \qquad \text{Equation (1)}$$

where $$I_A = 1 \text{ if deal is won} \qquad \text{Equation (2)}$$

$$I_A = -1 \text{ if deal is lost} \qquad \text{Equation (3)}$$

If activities along with their qualitative nature are associated together, i.e. including (a), (b) and (c), the following equation is used $$\text{label}_m = 0.5 + 0.5 * \left( \frac{\sum_{k=1}^{m} \alpha_k}{\sum_{i=1}^{n} \alpha_i} \right) * I_A \qquad \text{Equation (4)}$$

where $\alpha_i$ represents polarity and qualitative value of $i^{th}$ activity. For numerator k=1−m represents activities happening until as-of-date, denominator i=1−n represents overall activity on deals—lifetime. Please note that α capture the magnitude of impact of the activity.

In some embodiments, m represent as-of-that time. For example, if a label is evaluated after 2 week, m=2. In this example, activities that occurred until the end of 2nd week are considered. Also, in this example, the numerator includes all activities until the end of the 2nd week, and denominator includes the sum total of all activities.

For purposes of explanation, Equation (1) essentially provides the labels, that is, Equation (1) says at the start of the deal, the label is 0.5. As the deal progresses, the labels are assigned based on the amount of activity until that time. In one example, consider a deal that lasts for 4 weeks. During the 1st week, there may be 10 activities, during the second week, there may be 5 activities, during the 3rd week, there may be 5 activities, and during the 4th week, there may be 10 activities. In this example, activities may include call, event, email and non-email related activities. Thus, total activities are 30 are given in this example. Let's also assume the deal is closed and won—meaning that the deal successfully closed. In this case, the following is produced.

At the end of week 1, label=0.5+0.5*10/30*1=0.67
At the end of week 2, label=0.5+0.5*15/30*1=0.75
At the end of week 3, label=0.5+0.5*20/30*1=0.83
At the end of week 4, label=0.5+0.5*30/30*1=1

Continuing with this example, Equation (2) and Equation (3) have indicator functions. For instance, Equation (2) produces 1 if deal is won and Equation (3) produces −1 if deal is lost. In Equation (1), the impact is considered for each of the activities are same but in Equation (4), impact are considered for activities that are different.

For purposes of explanation, let's start with Equations (2) and (3). These Equations represent same thing, i.e., they are the indicator function which has been used in Equations (1) and (4). In short, with respect to Equation (2), if the deal is won, the IA of Equations (1) and (4) are replaced by +1. Regarding Equation (3), if the deal is lost, the IA is replaced by −1.

Turning to Equation (4), this equation is similar to Equation (1) with the only difference being that '1' is used in Equation (1) and α being used in Equation (4). In Equation (1), the impact of activities are considered as same. Let's say for example that an email related activity may have more impact on a deal but has not been considered in Equation (1). In Equation (4), the email related activity has been capture, and is denoted by α(k). Essentially, Equation (4) tries to capture the impact of each activity differently.

These changes in the framework help to reduce bias and improve overall performance of the model during the inference/production stage.

Figure 2:
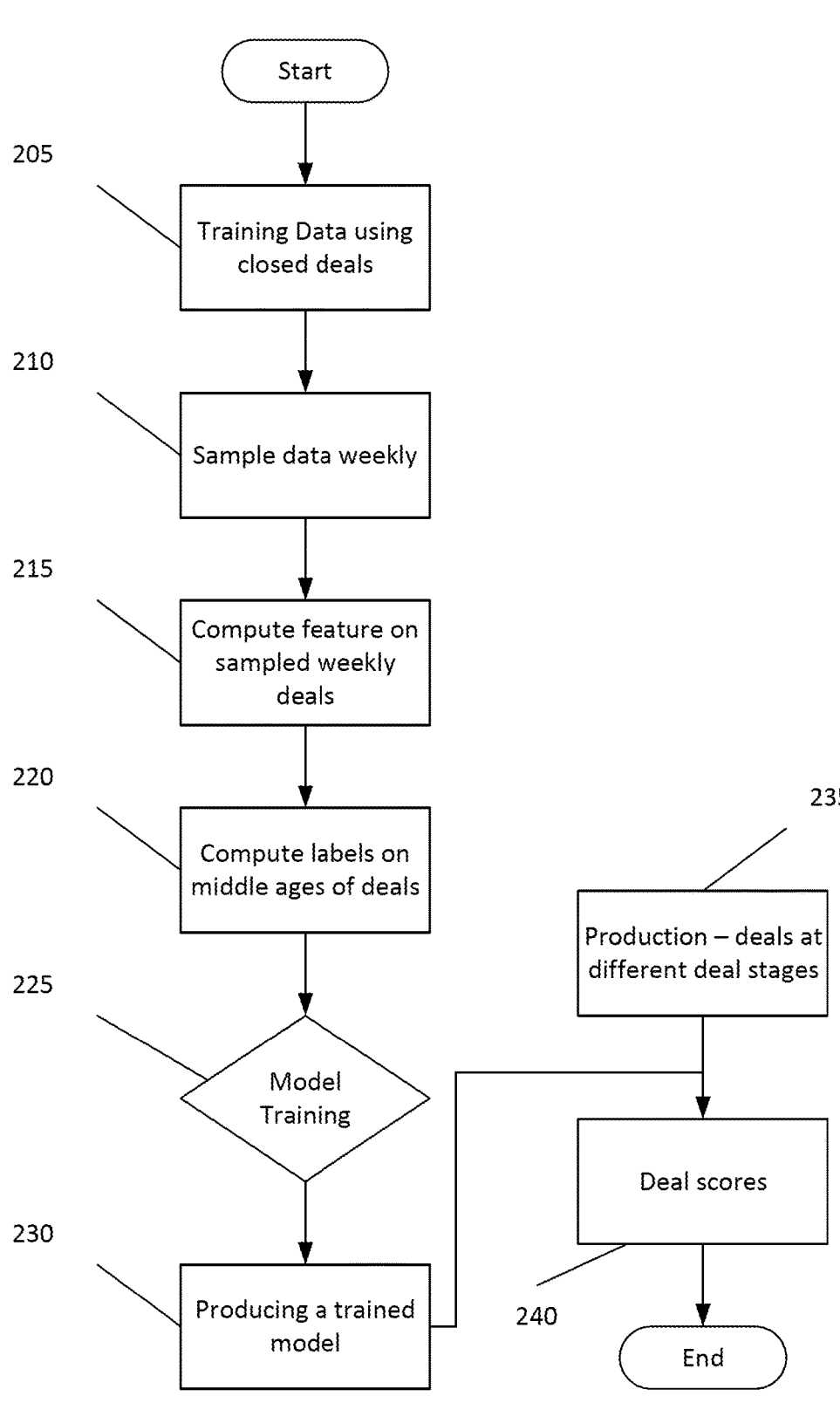
FIG. 2 is a flow diagram illustrating a method for performing label biasing of data associated with closed deals using interpolation, according to an embodiment of the present invention.

FIG. 2 is a flow diagram illustrating a method 200 for identifying and correcting label biasing of data associated with closed deals using interpolation, according to an embodiment of the present invention. In this embodiment, method 200 includes training data at 205 from a data lake or a data storage. The training data includes all closed deals, i.e., any data associated with deals that are no longer active. At 210, method 200 includes sampling the data for any closed deals on a weekly basis to capture all stages of life of the deal. Sampling, in this embodiment, may include sampling (or checking) the training data on a weekly (or periodically) during the lifetime of the deal to capture multiple life stages of each deal.

At 215, method 200 includes computing features associated with the weekly sampled data. Features may include for time-static attributes of deal which do not change with time, and also, attributes which changes with time, e.g. email interactions or non-email interaction, etc.

At 220, method 200 includes computing labels for any deal in the middle age of the deal. For example, the deal may be active for 4 months. In this example, of particular interest is the calculating of the label after each week where the natural label (win/lost) will not help.

At 225, method 200 includes performing model training. In this embodiment, the model is trained on weekly sampled data of a closed deal using XGboost algorithm, for example. At 230, method 200 includes producing the trained model from step 225.

At 235, method 200 includes performing production, i.e., calculating features of production (or live) data. In one example, once a model is trained, the model can be taken into production, where for each open deal, the model generates scores. These scores are essentially the probability of winning that deal. At 240, method 200 includes generating deal scores from the output of step 240, which are given into the trained model, i.e., output of features in production.

FIG. 3 is an architectural diagram illustrating a computing system 300 configured to perform label biasing of data associated with closed deals using interpolation, according to an embodiment of the present invention. In some embodiments, computing system 300 may be one or more of the computing systems depicted and/or described herein. Computing system 300 includes a bus 305 or other communication mechanism for communicating information, and processor(s) 310 coupled to bus 305 for processing information. Processor(s) 310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 310 may also have multiple processing cores, and at least some of the cores may be configured to perform specific functions. Multi-parallel processing may be used in some embodiments. In certain embodiments, at least one of processor(s) 310 may be a neuromorphic circuit that includes processing elements that mimic biological neurons. In some embodiments, neuromorphic circuits may not require the typical components of a Von Neumann computing architecture.

Computing system 300 further includes a memory 315 for storing information and instructions to be executed by processor(s) 310. Memory 315 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 310 and may include volatile media, non-volatile media, or both. The media may also be removable, non-removable, or both.

Additionally, computing system 300 includes a communication device 320, such as a transceiver, to provide access to a communications network via a wireless and/or wired connection. In some embodiments, communication device 320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 310 are further coupled via bus 305 to a display 325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 325 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 330 and a cursor control device 335, such as a computer mouse, a touchpad, etc., are further coupled to bus 305 to enable a user to interface with computing system. However, in certain embodiments, a physical keyboard and mouse may not be present, and the user may interact with the device solely through display 325 and/or a touchpad (not shown). Any type and combination of input devices may be used as a matter of design choice. In certain embodiments, no physical input device and/or display is present. For instance, the user may interact with computing system 300 remotely via another computing system in communication therewith, or computing system 400 may operate autonomously.

Memory 315 stores software modules that provide functionality when executed by processor(s) 310. The modules include an operating system 340 for computing system 300. The modules further include a email timing module 345 that is configured to perform all or part of the processes described herein or derivatives thereof. Computing system 300 may include one or more additional functional modules 350 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
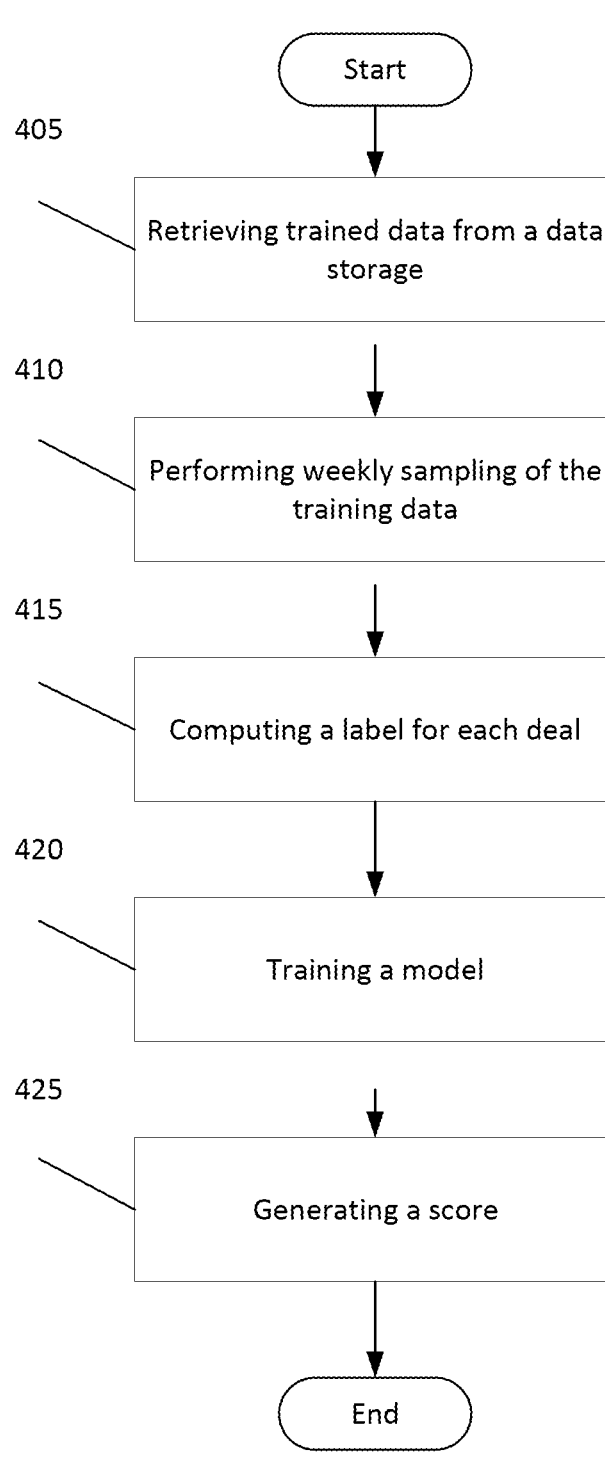
FIG. 4 is a flow diagram illustrating a method for performing label biasing of data using interpolation, according to an embodiment of the present invention.

FIG. 4 is a flow diagram illustrating a method 400 for performing label biasing of data using interpolation, according to an embodiment of the present invention. In some embodiments, method 400 is configured to be executed by computing system 300 of FIG. 3. Method 400 may begin at 405 with retrieving training data from a data storage, and at 410, performing weekly sampling of the training data to capture one or more stages for each of a plurality of open deals. At 415, method 400 includes computing a label for each of the plurality of open deals and a plurality of closed deals, wherein the label is computed with a '1' or '0'. At 420, method 400 includes training a model on the periodically sampled training data associated with the plurality of closed deal, and at 425, generating a score for each of the plurality of closed deal and for each of the plurality of open deals.

The process steps performed in FIGS. 1, 2, and 4 may be performed by a computer program, encoding instructions for the processor(s) to perform at least part of the process(es) described in FIGS. 1, 2, and 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 310 of computing system 300 of

9

FIG. 3) to implement all or part of the process steps described in FIGS. 1, 2, and 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

10

The invention claimed is:

1. A computer-implemented method for performing label biasing of data associated with one of a plurality of closed deals using interpolation, comprising:

retrieving, by at least one processor, training data from a data storage;

sampling, by the at least one processor, the training data periodically to capture one or more stages for each of a plurality of open deals;

computing, by the at least one processor, a label for each of the plurality of open deals and a plurality of closed deals, wherein the label is computed with a '1' or '0';

training, by the at least one processor, a model on the periodically sampled training data associated with the plurality of closed deals, wherein the training of the model comprises training the model on weekly sampled data of at least one of the plurality of the closed deals using a gradient boosting algorithm and the labels for the plurality of closed deals to reduce label bias and improve overall performance of the model; and generating, by the at least one processor, a score for each of the plurality of closed deals and for each of the plurality of open deals using the trained model, wherein the computing of the label comprises defining the label as an amount of activity that is captured using:

$$label_m = 0.5 + 0.5 * \left( \frac{\sum_{k=1}^{m} 1}{\sum_{i=1}^{n} 1} \right) * I_A$$

where
$I_A=1$ if deal is won
$I_A=-1$ if deal is lost, and
m represents a period of time for when the label is evaluated; or
the computing of the label comprises, responsive to an activity along with a qualitative nature of the activity being associated together, defining the label as an amount of the activity that is captured using:

$$label_m = 0.5 + 0.5 * \left( \frac{\sum_{k=1}^{m} \alpha_k}{\sum_{i=1}^{n} \alpha_i} \right) * I_A$$

where $\alpha_i$ represents a polarity and qualitative value of an $i^{th}$ activity,
for numerator k=1−m represents activities happening until as-of-date, and
denominator i=1−n represents overall activity on deals-lifetime.

2. The computer-implemented method of claim 1, wherein the data storage stores the training data, the training data comprising the plurality of closed deals and the plurality of open deals.

3. The computer-implemented method of claim 1, further comprising:

computing, by the at least one processor, a plurality of features associated with the periodically sampled trained data, wherein the plurality of features comprise one or more time-static attributes for each of the plurality of open deals that does not change with time, and one or more attributes that changes with time.

4. The computer-implemented method of claim 1, wherein computing of the label for data associated with one of the plurality of deals in a middle stage comprises interpolating a plurality of middle points based on a number of activities to characterize the label in '1' or '0'.

5. The computer-implemented method of claim 1, further comprising:

generating, by the at least one processor, a deal score from production data that is fed into a trained model.

6. A system configured to perform label biasing of data associated with one of a plurality of closed deals using interpolation, comprising:

memory comprising a set of instructions; and at least one processor, wherein the set of instructions are configured to cause at least one processor to execute:

retrieving training data from a data storage;

sampling the training data periodically to capture one or more stages for each of a plurality of open deals;

computing a label for each of the plurality of open deals and a plurality of closed deals, wherein the label is computed with a '1' or '0';

training a model on the periodically sampled training data associated with the plurality of closed deals, wherein the training of the model comprises training the model on weekly sampled data of at least one of the plurality of the closed deals using a gradient boosting algorithm and the labels for the plurality of closed deals to reduce label bias and improve overall performance of the model; and generating a score for each of the plurality of closed deals and for each of the plurality of open deals using the trained model, wherein the computing of the label comprises defining the label as an amount of activity that is captured using:

$$\text{label}_m = 0.5 + 0.5 * \left( \frac{\sum_{k=1}^{m} 1}{\sum_{i=1}^{n} 1} \right) * I_A$$

where $I_A$=1 if deal is won $I_A$=−1 if deal is lost, and m represents a period of time for when the label is evaluated; or the computing of the label comprises, responsive to an activity along with a qualitative nature of the activity being associated together, defining the label as an amount of the activity that is captured using:

$$\text{label}_m = 0.5 + 0.5 * \left( \frac{\sum_{k=1}^{m} \alpha_k}{\sum_{i=1}^{n} \alpha_i} \right) * I_A$$

where $\alpha_i$ represents a polarity and qualitative value of an $i^{th}$ activity, for numerator k=1−m represents activities happening until as-of-date, and denominator i=1−n represents overall activity on deals-lifetime.

7. The system method of claim 6, wherein the data storage stores the training data, the training data comprising the plurality of closed deals and the plurality of open deals.

8. The system of claim 6, wherein the set of instructions are further configured to cause at least one processor to execute:

computing a plurality of features associated with the periodically sampled trained data, wherein the plurality of features comprise one or more time-static attributes for each of the plurality of open deals that does not change with time, and one or more attributes that changes with time.

9. The system of claim 6, wherein the set of instructions are further configured to cause at least one processor to execute:

interpolating a plurality of middle points based on a number of activities to characterize the label in '1' or '0'.

10. The system of claim 6, wherein the set of instructions are further configured to cause at least one processor to execute:

generating a deal score from production data that is fed into a trained model.

11. A computer program embodied on a non-transitory computer-readable medium, the computer program is configured to perform label biasing of data associated with one of a plurality of closed deals using interpolation, and cause at least one processor to execute:

retrieving training data from a data storage;

sampling the training data periodically to capture one or more stages for each of a plurality of open deals;

computing a label for each of the plurality of open deals and a plurality of closed deals, wherein the label is computed with a '1' or '0';

training a model on the periodically sampled training data associated with the plurality of closed deals, wherein the training of the model comprises training the model on weekly sampled data of at least one of the plurality of the closed deals using a gradient boosting algorithm and the labels for the plurality of closed deals to reduce label bias and improve overall performance of the model; and generating a score for each of the plurality of closed deals and for each of the plurality of open deals using the trained model, wherein the computing of the label comprises defining the label as an amount of activity that is captured using:

$$\text{label}_m = 0.5 + 0.5 * \left( \frac{\sum_{k=1}^{m} 1}{\sum_{i=1}^{n} 1} \right) * I_A$$

where $I_A$=1 if deal is won $I_A$=−1 if deal is lost, and m represents a period of time for when the label is evaluated; or the computing of the label comprises, responsive to an activity along with a qualitative nature of the activity being associated together, defining the label as an amount of the activity that is captured using:

$$\text{label}_m = 0.5 + 0.5 * \left( \frac{\sum_{k=1}^{m} \alpha_k}{\sum_{i=1}^{n} \alpha_i} \right) * I_A$$

where $\alpha_i$ represents a polarity and qualitative value of an $i^{th}$ activity, for numerator k=1–m represents activities happening until as-of-date, and denominator i=1–n represents overall activity on deals-lifetime.

12. The computer program of claim 11, wherein the data storage stores the training data, the training data comprising the plurality of closed deals and the plurality of open deals.

13. The computer program of claim 11, wherein the computer program is further configured to cause at least one processor to execute:

computing a plurality of features associated with the periodically sampled trained data, wherein the plurality of features comprise one or more time-static attributes for each of the plurality of open deals that does not change with time, and one or more attributes that changes with time.

14. The computer program of claim 11, wherein the computer program is further configured to cause at least one processor to execute:

interpolating a plurality of middle points based on a number of activities to characterize the label in '1' or '0'.

* * * * *